(12) United States Patent
Sato (10) Patent No.: US 10,700,622 B2
(45) Date of Patent: Jun. 30, 2020

(54) APPARATUS FOR CONTROLLING BRUSHLESS MOTOR AND METHOD FOR CONTROLLING BRUSHLESS MOTOR

(71) Applicant: Panasonic Intellectual Property Management Co., Ltd., Osaka (JP)

(72) Inventor: Daisuke Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/342,558

(22) PCT Filed: Aug. 29, 2017

(86) PCT No.: PCT/JP2017/030825
§ 371 (c)(1),
(2) Date: Apr. 17, 2019

(87) PCT Pub. No.: WO2018/079052
PCT Pub. Date: May 3, 2018

(65) Prior Publication Data
US 2020/0052618 A1 Feb. 13, 2020

(30) Foreign Application Priority Data
Oct. 28, 2016 (JP) .................................. 2016-212286

(51) Int. Cl.
*H02P 23/12* (2006.01)
*H02P 6/15* (2016.01)

(52) U.S. Cl.
CPC .................................. *H02P 6/153* (2016.02)

(58) Field of Classification Search
CPC ....................................................... H02P 6/153
(Continued)

(56) References Cited

U.S. PATENT DOCUMENTS

2004/0257027 A1* 12/2004 Matsuo ................... H02P 21/26
318/722
2010/0264862 A1 10/2010 Kitagawa
(Continued)

FOREIGN PATENT DOCUMENTS

JP          8-308292      11/1996
JP       2010-268673      11/2010
(Continued)

OTHER PUBLICATIONS

International Search Report of PCT application No. PCT/JP2017/030825 dated Nov. 14, 2017.

*Primary Examiner* — Erick D Glass
(74) *Attorney, Agent, or Firm* — McDermott Will & Emery LLP (57) ABSTRACT

A brushless motor control apparatus includes an inverter circuit that applies a drive voltage to a winding of each phase of a brushless motor, a rotor magnetic pole detector that outputs a magnetic pole detection signal corresponding to a rotor position of the brushless motor based on a change of a magnetic pole detected by a Hall sensor, a rotor position estimator that outputs, each time a level of the magnetic pole detection signal is switched, an estimated rotor position signal that indicates an estimated rotor position with an electrical angle and indicates a predetermined electrical angle corresponding to the level after switching, a current detector that detects a current supplied to the inverter circuit as a power source current value, and an electrical angle correction unit that corrects the estimated rotor position signal by determining an electrical angle offset based on fluctuation in the power source current value and adding the electrical angle offset to the electrical angle indicated by the estimated rotor position signal.

6 Claims, 10 Drawing Sheets

(58) Field of Classification Search
USPC .................................................. 318/400.14
See application file for complete search history.

(56) References Cited

U.S. PATENT DOCUMENTS

2018/0123492 A1* 5/2018 Koide .................... H02P 21/26
2019/0319560 A1* 10/2019 Shi ........................... H02P 6/21

FOREIGN PATENT DOCUMENTS

| JP | 5469520 B | 4/2014 |
| JP | 2015-050789 | 3/2015 |

\* cited by examiner

Case of electrical angle offset
Posn = 0

Magnetic pole
detection signal
Hdet
Power source
current value
Adet

APPARATUS FOR CONTROLLING BRUSHLESS MOTOR AND METHOD FOR CONTROLLING BRUSHLESS MOTOR

TECHNICAL FIELD

The present disclosure relates to a brushless motor control apparatus and a brushless motor control method for controlling rotation of a brushless motor. In particular, the present disclosure relates to a brushless motor control apparatus and a brushless motor control method for detecting a rotor position by a position detection unit such as a Hall sensor during a rotary operation of a brushless motor to determine timing of energization to a motor coil.

BACKGROUND ART

In recent years, a brushless motor is used for a battery cooling fan of a hybrid vehicle that has been commonly used, due to requests for improved lifetime, energy saving, and decreased noise of the battery cooling fan. For the cooling fan, air volume required by the fan and driving sound produced in the periphery of the fan are defined according to an air temperature and a temperature of a cooling target at each time. The cooling fan needs to be controlled so as to satisfy those requirements. It is known that variation in air volume depends on variation in rotary speed of a motor attached to an impeller (bladed wheel). It is known that driving sound and motor vibration depend on a rotational torque of the motor.

Incidentally, a three-phase brushless motor controlled with pulse width modulation (PWM) driving is controlled by a motor control apparatus in the following manner. First, the motor control apparatus detects a rotational position of a rotor from a rising edge and a falling edge of an output level of a Hall sensor. An actual rotary speed is calculated from a change amount of the rotational position per unit time. In the motor control apparatus, a switching pulse width of a metal oxide semiconductor field effect transistor (MOS-FET) installed in an inverter circuit that achieves the PWM driving is controlled according to the actual rotary speed thus calculated.

Therefore, due to variation in an attachment position of the Hall sensor and magnetization of an N-pole and an S-pole of a rotor magnet or other factors, the output level of the Hall sensor is not switched at a predetermined rotational position of the rotor. This disadvantageously shifts timing of the rising or falling edge. It is known that, for example, an energization phase or period from the inverter circuit to a motor coil is deviated by this shift. It is also known that torque ripple of the motor is increased, and vibration and noise are also increased.

As a countermeasure to such variation, a technology that detects an induced voltage to correct a relative positional shift of each Hall sensor has been known (for example, PTL 1).

CITATION LIST

Patent Literature

PTL 1: Japanese Patent No. 5,469,520

SUMMARY OF THE INVENTION

An object of the present disclosure is to provide a brushless motor control apparatus and a brushless motor control method that correct a shift of a detected position of a rotor due to variation in response or a positional shift of a Hall sensor to reduce torque ripple, without adding parts unnecessary upon a normal rotation.

To achieve the above-described object, one aspect of a brushless motor control apparatus of the present disclosure includes: an inverter circuit that applies a drive voltage to a winding of each phase of a brushless motor; a rotor magnetic pole detector that outputs a magnetic pole detection signal corresponding to a rotor position of the brushless motor based on a change of a magnetic pole detected by a Hall sensor; a rotor position estimator that outputs, each time a level of the magnetic pole detection signal is switched, an estimated rotor position signal that indicates an estimated rotor position with an electrical angle and indicates a predetermined electrical angle corresponding to the level after switching; a current detector that detects a current supplied to the inverter circuit as a power source current value; and an electrical angle correction unit that corrects the estimated rotor position signal by determining an electrical angle offset based on fluctuation in the power source current value and adding the electrical angle offset to the electrical angle indicated by the estimated rotor position signal.

One aspect of a brushless motor control method of the present disclosure is a brushless motor control method that uses an inverter circuit that applies a drive voltage to a winding of each phase of a brushless motor. The brushless motor control method includes: outputting a magnetic pole detection signal corresponding to a rotor position of the brushless motor based on a change of a magnetic pole detected by a Hall sensor; outputting, each time a level of the magnetic pole detection signal is switched, an estimated rotor position signal that indicates an estimated rotor position with an electrical angle and indicates a predetermined electrical angle corresponding to the level after switching; detecting a current supplied to the inverter circuit as a power source current value; determining an electrical angle offset based on fluctuation in the power source current value; and correcting the estimated rotor position signal by adding the electrical angle offset to the electrical angle indicated by the estimated rotor position signal.

According to the brushless motor control apparatus and the brushless motor control method of the present disclosure, a shift of a detected position of a rotor due to variation in response or a positional shift of a Hall sensor can be corrected to reduce torque ripple, without adding parts unnecessary upon a normal rotation.

DESCRIPTION OF EMBODIMENT

PTL 1 requires parts unnecessary upon a normal rotation, for example, a comparator that compares a neutral point of a motor coil with an induced voltage, or an exclusive OR (EX-OR) circuit that outputs exclusive OR of an output of the comparator and an output of a Hall sensor. This increases a number of parts, leading to an increase in size and cost of a motor control apparatus.

Hereinafter, an exemplary embodiment will be described with reference to the drawings.

EXEMPLARY EMBODIMENT

Figure 1:
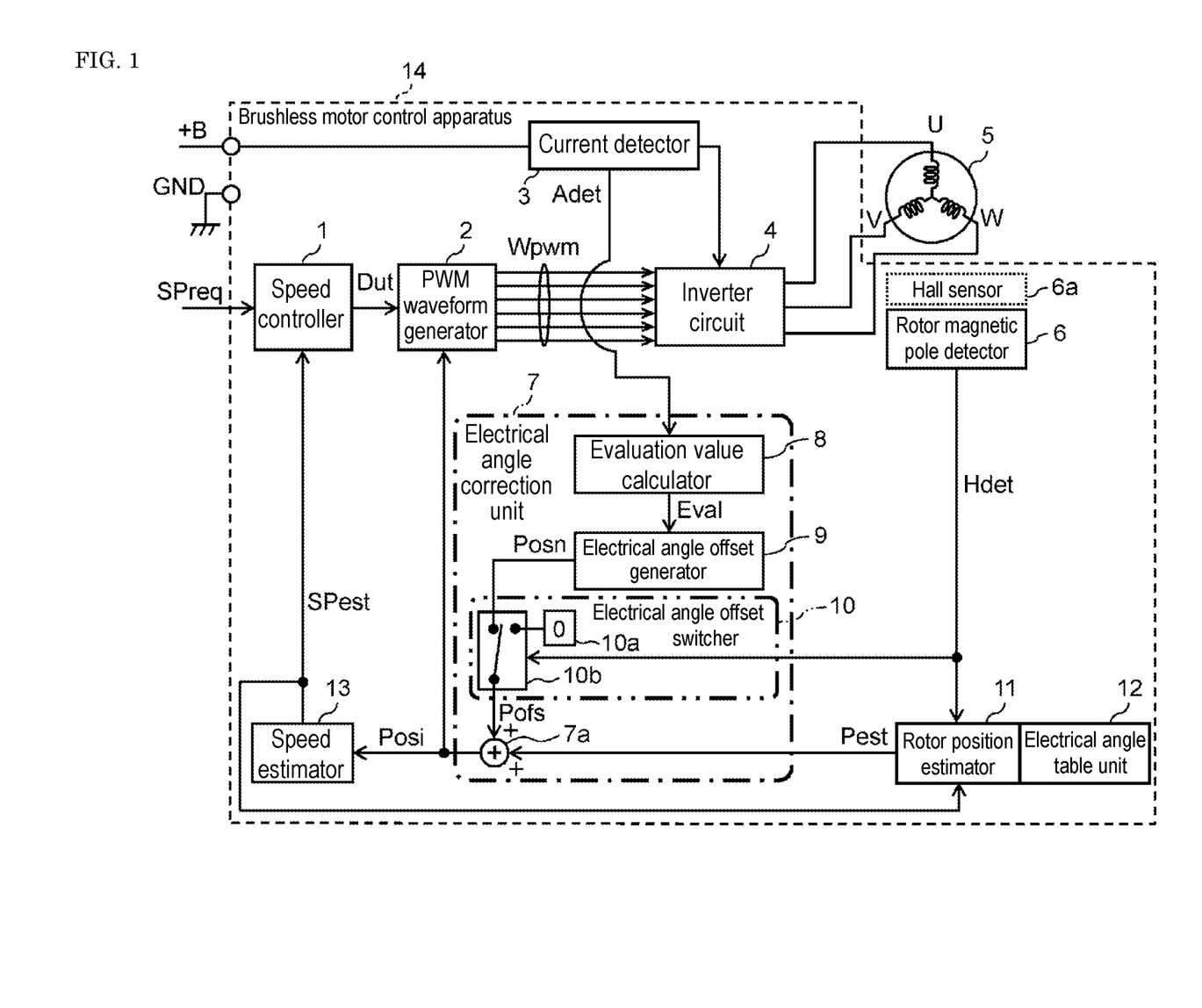
FIG. 1 is a block diagram illustrating a configuration example of a brushless motor control apparatus of an exemplary embodiment, and a brushless motor.

FIG. 1 is a block diagram illustrating a configuration example of brushless motor control apparatus 14 of the exemplary embodiment, and brushless motor 5. In FIG. 1, brushless motor control apparatus 14 is supplied with power through motor driving power source line+B and a GND line. Brushless motor control apparatus 14 receives speed instruction SPreq and controls rotation of brushless motor 5. Brushless motor control apparatus 14 is configured with speed controller 1, PWM waveform generator 2, current detector 3, inverter circuit 4, rotor magnetic pole detector 6, electrical angle correction unit 7, rotor position estimator 11, and speed estimator 13. Further, rotor magnetic pole detector 6 is connected to Hall sensor 6a provided to brushless motor 5. Electrical angle correction unit 7 is configured with evaluation value calculator 8, electrical angle offset generator 9, electrical angle offset switcher 10, and adder 7a. Rotor position estimator 11 includes electrical angle table unit 12.

Speed controller 1 receives speed instruction SPreq for instructing a rotary speed of brushless motor 5, and estimated speed SPest from speed estimator 13. Speed controller 1 sets and outputs PWM duty value Dut such that estimated speed SPest satisfies speed instruction SPreq.

PWM waveform generator 2 outputs PWM signal Wpwm to the inverter circuit according to PWM duty value Dut from speed controller 1. PWM signal Wpwm controls turning on and off of switching elements in inverter circuit 4.

Current detector 3 detects a current supplied to inverter circuit 4 as power source current value Adet.

Inverter circuit 4 applies a drive voltage to a winding of each phase in brushless motor 5 according to PWM signal Wpwm from PWM waveform generator 2.

Brushless motor 5 is, for example, a three-phase brushless motor, and includes a stator including a U-phase winding, a V-phase winding, and a W-phase winding, and a magnetized rotor.

Rotor magnetic pole detector 6 outputs digital magnetic pole detection signal Hdet corresponding to a rotor position of brushless motor 5 based on a change of a magnetic pole detected by Hall sensor 6a.

Rotor position estimator 11 outputs estimated rotor position signal Pest indicating an estimated rotor position with an electrical angle. Estimated rotor position signal Pest is a signal indicating a value of the electrical angle ranging from 0 degree to 360 degrees. Rotor position estimator 11 generates estimated rotor position signal Pest based on electrical angle table unit 12 and estimated speed SPest. Specifically, each time a level of magnetic pole detection signal Hdet is switched, estimated rotor position signal Pest indicating a predetermined electrical angle corresponding to the level after switching is output. The predetermined electrical angle is set in electrical angle table unit 12 for each type of level switching (in other words, a rising edge and a falling edge). Rotor position estimator 11 estimates the electrical angle of estimated rotor position signal Pest based on estimated speed SPest during a period from level switching to next level switching of magnetic pole detection signal Hdet.

Electrical angle correction unit 7 determines electrical angle offset Pofs based on fluctuation in power source current value Adet detected by current detector 3. Electrical angle correction unit 7 corrects estimated rotor position signal Pest by adding electrical angle offset Pofs to the electrical angle indicated by estimated rotor position signal Pest. Electrical angle correction unit 7 outputs estimated rotor position signal Posi after the correction. Electrical angle offset Pofs is determined to be an appropriate value for reducing the fluctuation in power source current value Adet by electrical angle offset generator 9.

Figure 2A:
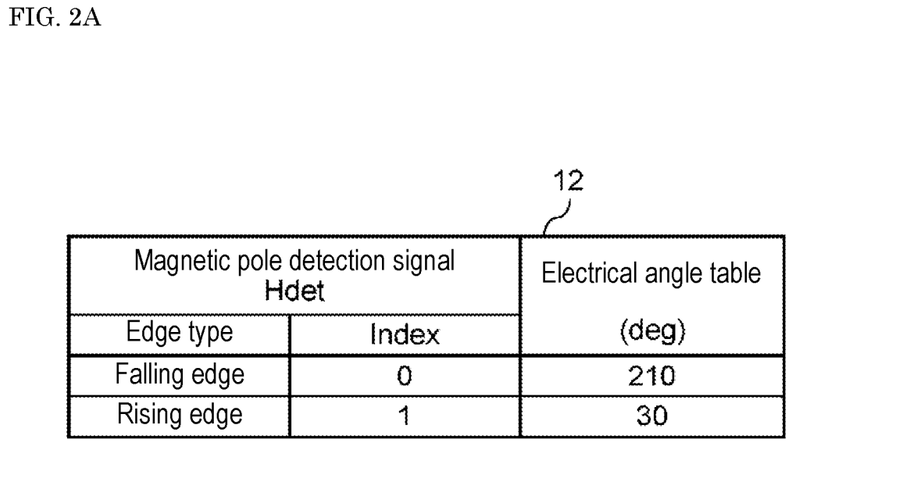
FIG. 2A is a table illustrating an example of an electrical angle table unit.

Electrical angle table unit 12 retains an electrical angle table. FIG. 2A is a table illustrating an example of electrical angle table unit 12. FIG. 2A indicates that the electrical angle of the rotor corresponding to timing of the falling edge of magnetic pole detection signal Hdet is 210 degrees, and the electrical angle of the rotor corresponding to timing of the rising edge is 30 degrees. In this case, the electrical angle table may be a table that retains an electrical angle (210 degrees) corresponding to index 0 and an electrical angle (30 degrees) corresponding to index 1. For example, when index 0 is input, electrical angle table unit 12 outputs an analog value or a digital value corresponding to the electrical angle of 210 degrees to rotor position estimator 11. When index 1 is input, electrical angle table unit 12 outputs the analog value or the digital value corresponding to the electrical angle of 30 degrees to rotor position estimator 11. For example, rotor position estimator 11 outputs index 0 to electrical angle table unit 12 at the timing of the falling edge of magnetic pole detection signal Hdet. Rotor position estimator 11 outputs index 1 to electrical angle table unit 12 at the timing of the rising edge of magnetic pole detection signal Hdet.

Speed estimator 13 estimates a rotary speed of the rotor based on estimated rotor position signal Posi after the correction, and outputs the estimated rotary speed as estimated speed SPest.

A configuration of electrical angle correction unit 7 will be described.

Evaluation value calculator 8 receives power source current value Adet detected by current detector 3, and calculates evaluation value Eval indicating the fluctuation in power source current value Adet during a rotary operation of brushless motor 5 at a constant speed. For example, this evaluation value Eval may be variance, amplitude, or frequency distribution.

Electrical angle offset generator 9 generates electrical angle offset Posn corresponding to a minimum value of evaluation value Eval. For example, electrical angle offset generator 9 corrects estimated rotor position signal Pest a plurality of times by gradually increasing or decreasing electrical angle offset Posn during the rotary operation of brushless motor 5 at the constant speed. Evaluation value calculator 8 calculates and retains, as evaluation value Eval, variance of a plurality of power source current values Adet detected by current detector 3 at each electrical angle offset Posn. Electrical angle offset generator 9 approximates a relationship between electrical angle offset Posn and the evaluation value with a polynomial, and calculates minimum evaluation value Eval in the polynomial. Electrical angle offset generator 9 determines, based on the polynomial, an electrical angle offset when evaluation value Eval is minimized as appropriate electrical angle offset Posn. Electrical angle offset Posn is determined based on the fluctuation in power source current value Adet in this manner, whereby an increase in circuit scale caused by addition of new parts can be suppressed.

Electrical angle offset switcher 10 outputs electrical angle offset Pofs to be added to an electrical angle indicated by estimated rotor position signal Pest during a period of one of a high level and a low level of magnetic pole detection signal Hdet. Electrical angle offset switcher 10 includes zero generator 10a and selector 10b. Zero generator 10a generates a zero signal indicating an electrical angle of 0 degree (for example, a signal of a ground level). Selector 10b selects one of the zero signal and electrical angle offset Posn. Selector 10b selects electrical angle offset Posn in a period of one of the high level and the low level of magnetic pole detection signal Hdet, and selects zero signal in a period of the other of the high level and the low level of magnetic pole detection signal Hdet. A selection result, that is, an output signal of selector 10b is referred to as electrical angle offset Pofs.

Adder 7a adds electrical angle offset Pofs to estimated rotor position signal Pest. An addition result, that is, an output signal of adder 7a is estimated rotor position signal Pest that has been corrected, and is referred to as estimated rotor position signal Posi.

The period of the one of the high level and the low level of magnetic pole detection signal Hdet is, for example, a low-level period. In this case, electrical angle correction unit 7 adds electrical angle offset Posn to estimated rotor position signal Pest in the low-level period of magnetic pole detection signal Hdet, and adds the zero signal to estimated rotor position signal Pest in a high-level period of magnetic pole detection signal Hdet. In other words, the electrical angle offset is added to only one of the electrical angles of the rotor that are preset in the electrical angle table (the electrical angle corresponding to the rising edge or the falling edge). This addition method is based on the following reason. When brushless motor 5 includes torque ripple, with respect to magnetic pole detection signal Hdet, the high-level period and the low-level period are not equal in time length to each other. Due to this situation, a change amount indicated by estimated rotor position signal Pest is different between the high-level period and the low-level period, whereby a value of estimated rotor position signal Pest is largely changed in a discontinuous manner (refer to FIG. 2B). In a period of one level, adding appropriate electrical angle offset Posn to the electrical angle indicated by estimated rotor position signal Pest corrects the large change in value of estimated rotor position signal Pest to be cancelled. In other words, unevenness of the change amount indicated by estimated rotor position signal Pest is corrected. This eventually leads to suppression of the torque ripple.

Next, specific examples of magnetic pole detection signal Hdet and estimated rotor position signal Pest will be described.

Figure 2B:
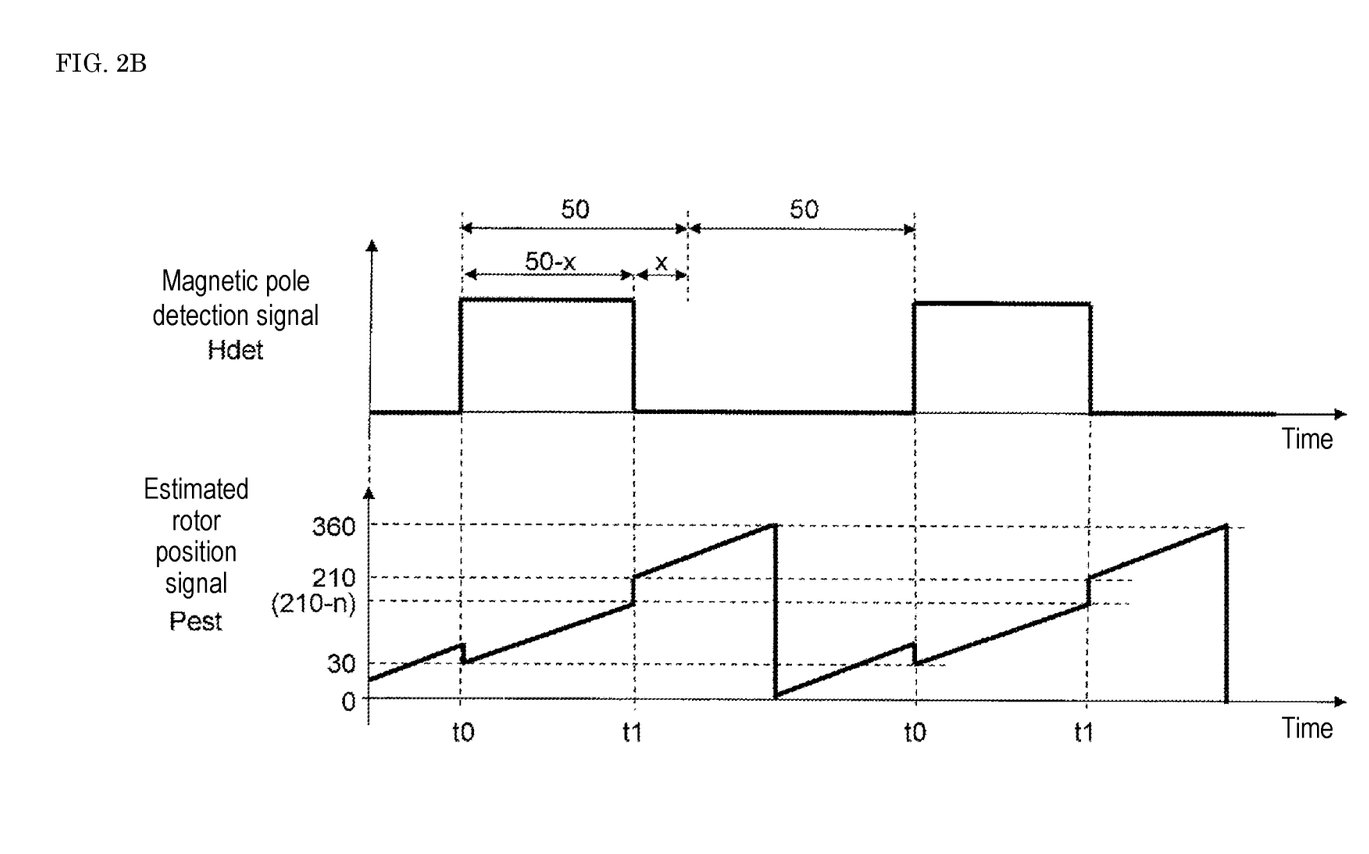
FIG. 2B is a timing chart illustrating a waveform of a magnetic pole detection signal output from a rotor magnetic pole detector and a waveform of an estimated rotor position signal output from a rotor position estimator.

FIG. 2B is a timing chart illustrating a waveform of magnetic pole detection signal Hdet output from rotor magnetic pole detector 6 and a waveform of estimated rotor position signal Pest output from rotor position estimator 11. In a case where Hall sensor 6a is mounted at an ideal position, when brushless motor 5 rotates at the constant speed, the high-level period and the low-level period in magnetic pole detection signal Hdet of rotor magnetic pole detector 6 are equal to each other. Herein, a case where the high-level period and the low-level period in magnetic pole detection signal Hdet of rotor magnetic pole detector 6 are not equal to each other is illustrated. This case is caused by some reasons such as a positional shift of Hall sensor 6a, or variation in response of Hall sensor 6a with respect to an N-pole and an S-pole. In magnetic pole detection signal Hdet in FIG. 2B, an example in which the high-level period:the low-level period is set not to 50:50 but to (50−x) (50+x) is illustrated.

As illustrated in FIG. 1, rotor position estimator 11 includes electrical angle table unit 12. Rotor position estimator 11 receives magnetic pole detection signal Hdet. In FIG. 2B, at time t0 and time t1 at which a signal level of magnetic pole detection signal Hdet is switched, rotor position estimator 11 refers to electrical angle table unit 12 described in FIG. 2A, and outputs a predetermined electrical angle for an edge type of magnetic pole detection signal Hdet as estimated rotor position signal Pest. As a result, estimated rotor position signal Pest indicates the electrical angle of 30 degrees at time t0 and indicates the electrical angle of 210 degrees at time t1.

Until next switching of the signal level (for example, periods t0 to t1, t1 to t0), the value of estimated rotor position signal Pest is gradually increased according to a speed of estimated speed SPest. When the high-level period and the low-level period of magnetic pole detection signal Hdet are not equal in time length to each other (for example, the high-level period is short and the low-level period is long, as illustrated in FIG. 2B), the change amount indicated in estimated rotor position signal Pest is different between the period of t0 to t1 and the period of t1 to t0, whereby the value of estimated rotor position signal Pest is largely changed in a discontinuous manner at time t0 and time t1.

Next, specific examples of magnetic pole detection signal Hdet and electrical angle offset Posn input into electrical angle offset switcher 10 and electrical angle offset Pofs output from electrical angle offset switcher 10 will be described.

Figure 3:
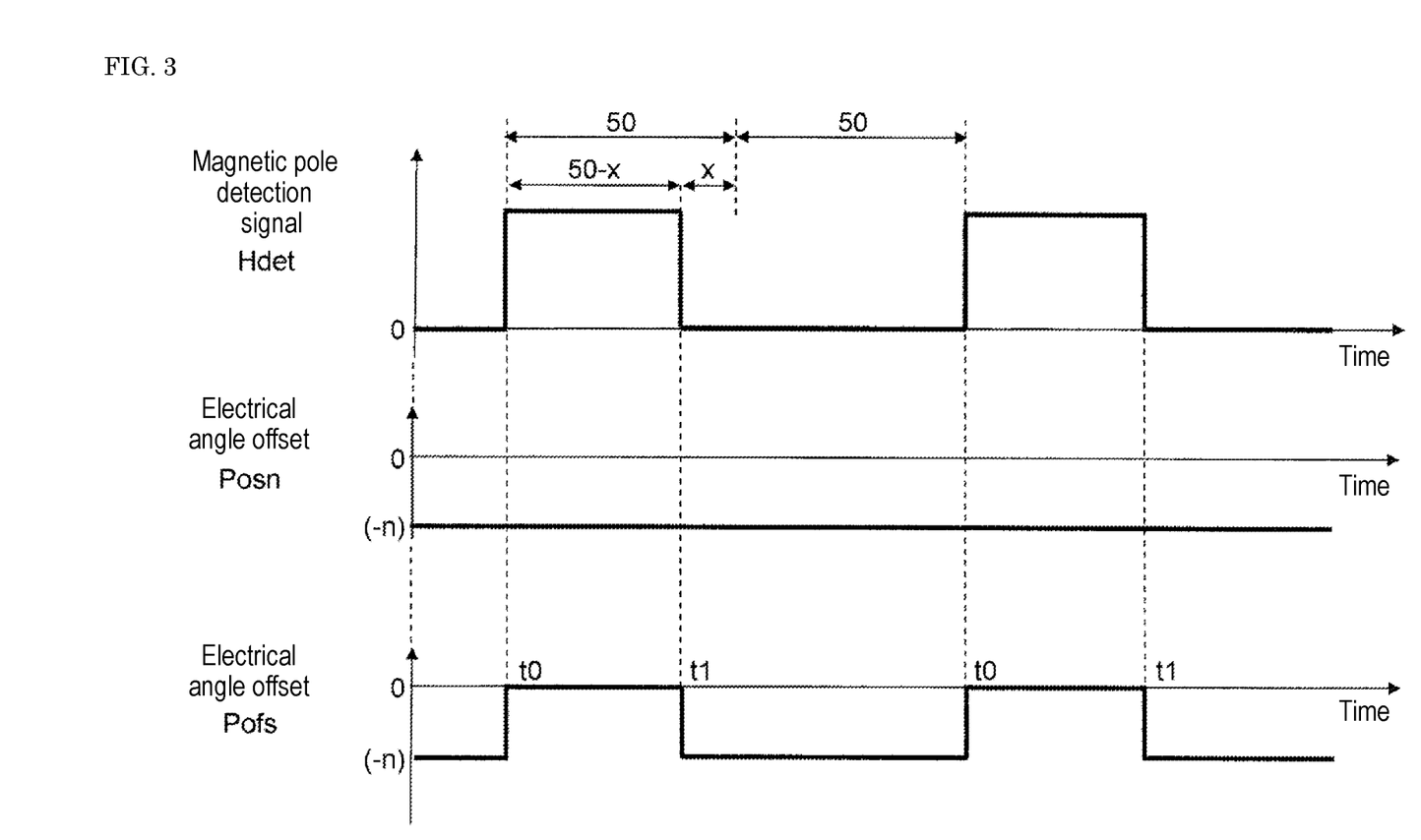
FIG. 3 is a timing chart illustrating the waveform of the magnetic pole detection signal output from the rotor magnetic pole detector, a waveform of an electrical angle offset output from an electrical angle offset generator, and a waveform of the electrical angle offset output from an electrical angle offset switcher.

FIG. 3 is a timing chart illustrating the waveform of magnetic pole detection signal Hdet output from rotor magnetic pole detector 6, a waveform of electrical angle offset Posn output from electrical angle offset generator 9, and a waveform of electrical angle offset Pofs output from electrical angle offset switcher 10. As illustrated in FIG. 1, electrical angle offset generator 9 outputs a value (−n degrees) determined by a method to be described later to electrical angle offset switcher 10 as electrical angle offset Posn.

Electrical angle offset switcher 10 receives magnetic pole detection signal Hdet as a signal for switching control. Electrical angle offset switcher 10 switches from electrical angle offset Posn (−n) to the zero signal at time t0 in FIG. 3 at which a level of magnetic pole detection signal Hdet is switched. Electrical angle offset switcher 10 switches from the zero signal to electrical angle offset Posn (−n) at time t1. In this manner, electrical angle offset switcher 10 outputs electrical angle offset Pofs. As a result, electrical angle offset Pofs is −n degrees when magnetic pole detection signal Hdet is low, and is 0 degree when magnetic pole detection signal Hdet is high.

Next, a specific example of correction of estimated rotor position signal Pest with electrical angle offset Pofs will be described.

Figure 4:
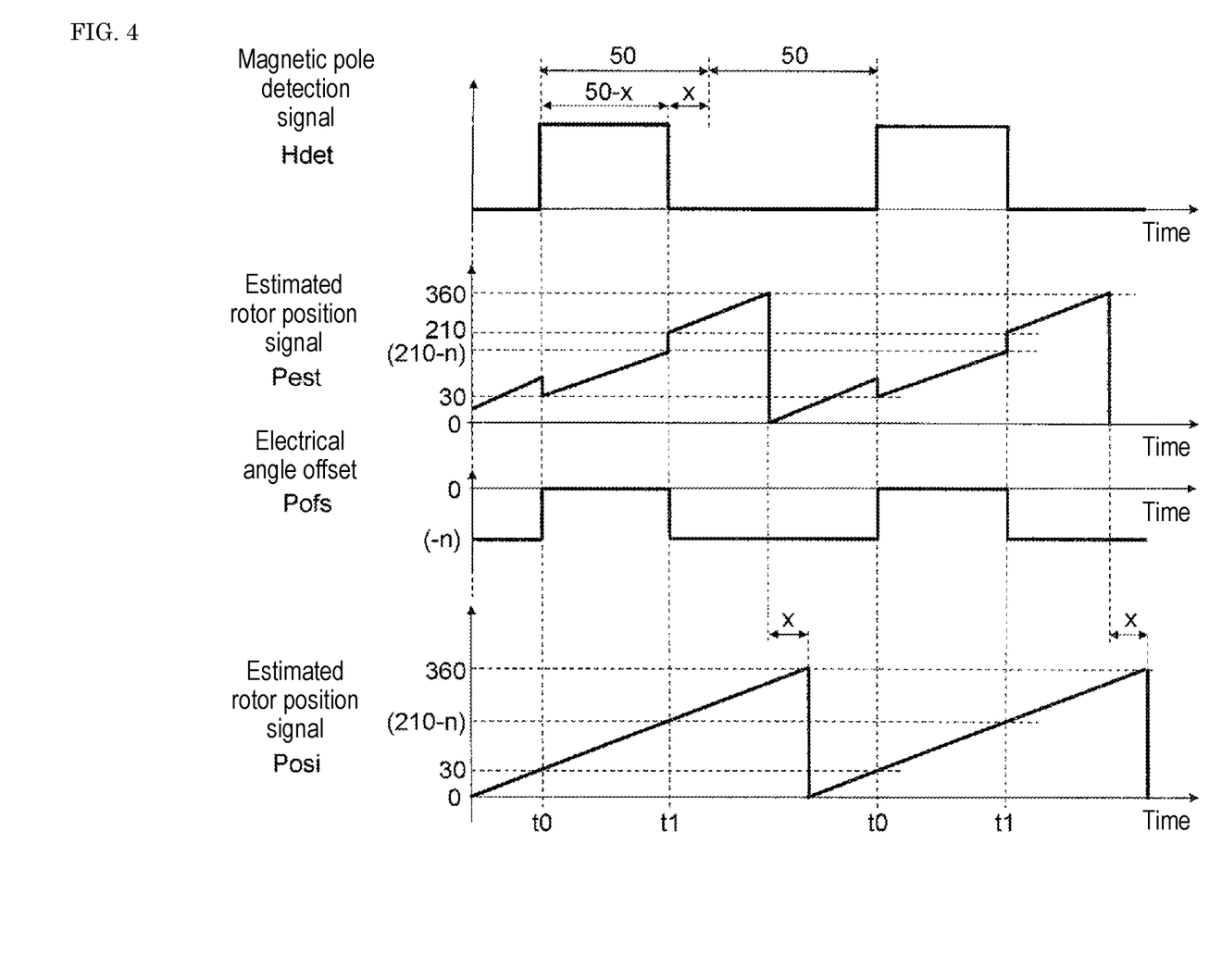
FIG. 4 is a timing chart illustrating the waveform of the magnetic pole detection signal output from the rotor magnetic pole detector, the waveform of the estimated rotor position signal output from the rotor position estimator, the waveform of the electrical angle offset output from the electrical angle offset switcher, and an waveform of the estimated rotor position signal output from an electrical angle correction unit.

FIG. 4 is a timing chart illustrating the waveform of magnetic pole detection signal Hdet output from rotor magnetic pole detector 6, the waveform of estimated rotor position signal Pest output from rotor position estimator 11, the waveform of electrical angle offset Pofs output from electrical angle offset switcher 10, and a waveform of estimated rotor position signal Posi output from electrical angle correction unit 7. As illustrated in FIG. 1, estimated rotor position signal Posi that is an output signal of electrical angle correction unit 7 is a sum of estimated rotor position signal Pest and electrical angle offset Pofs output from electrical angle offset switcher 10. Accordingly, electrical angle offset Pofs output from electrical angle offset switcher 10 is switched from −n to 0 at time t0, and is switched from 0 to −n at time t1. This causes estimated rotor position signal Posi output from electrical angle correction unit 7 to be a linearly increasing sawtooth waveform without steps.

Subsequently, how to determine the appropriate value of electrical angle offset Posn will be described.

Figure 5:
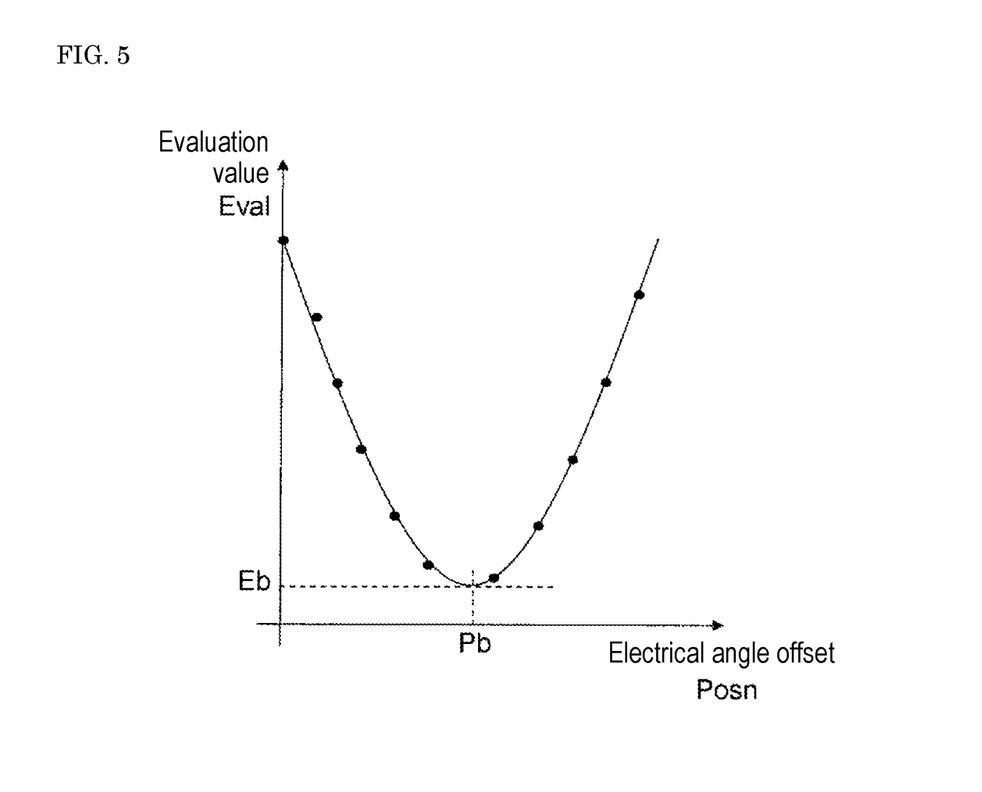
FIG. 5 is a graph plotting an evaluation value output from an evaluation value calculator when a value of the electrical angle offset output from the electrical angle offset generator is changed.

FIG. 5 is a graph plotting evaluation value Eval output from evaluation value calculator 8 when a value of electrical angle offset Posn output from electrical angle offset generator 9 is changed. As illustrated in FIG. 1, evaluation value calculator 8 receives power source current value Adet from current detector 3. Evaluation value calculator 8 calculates evaluation value Eval that is the variance of power source current values Adet from current detector 3 at predetermined time using (Expression 1). In FIG. 5, the value of electrical angle offset Posn is increased, and after the rotation is stabilized, a variance value of N pieces of data for one second is defined as Eval.

[Formula 1]

(Expression 1)

$$Eval = \frac{1}{N}\sum_{i=1}^{N}(x_i - \mu)^2 \qquad (式 1)$$

Herein, i is an integer from 1 to N, $x_i$ indicates N power source current values Adet detected continuously, and μ is an average value of $x_i$.

In the example in FIG. 5, evaluation value calculator 8 calculates N evaluation values Eval corresponding to N electrical angle offsets Posn gradually increased from 0.

Evaluation value Eval may be a standard deviation or a difference (width) between a maximum value and a minimum value, as long as it can express magnitude of the variation.

When the high-level period and the low-level period of magnetic pole detection signal Hdet are not equal to each other as illustrated in FIG. 2B, evaluation value Eval takes minimum value Eb when electrical angle offset Posn from electrical angle offset generator 9 is value Pb, as illustrated in FIG. 5. In this manner, FIG. 5 is a graph convex downward. Upon performing an adjustment operation, value Pb is obtained and the value (−n) of electrical angle offset Posn output from electrical angle offset generator 9 is set to be Pb illustrated in FIG. 3. This can reduce current amplitude (ripple).

Figure 6:
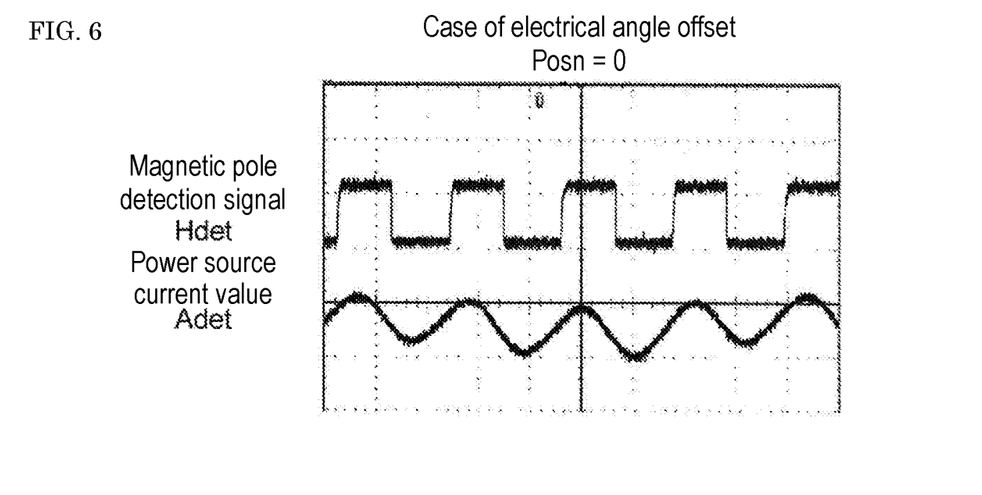
FIG. 6 is a graph illustrating the magnetic pole detection signal and a power source current value when the electrical angle offset is set to be 0.
Figure 7:
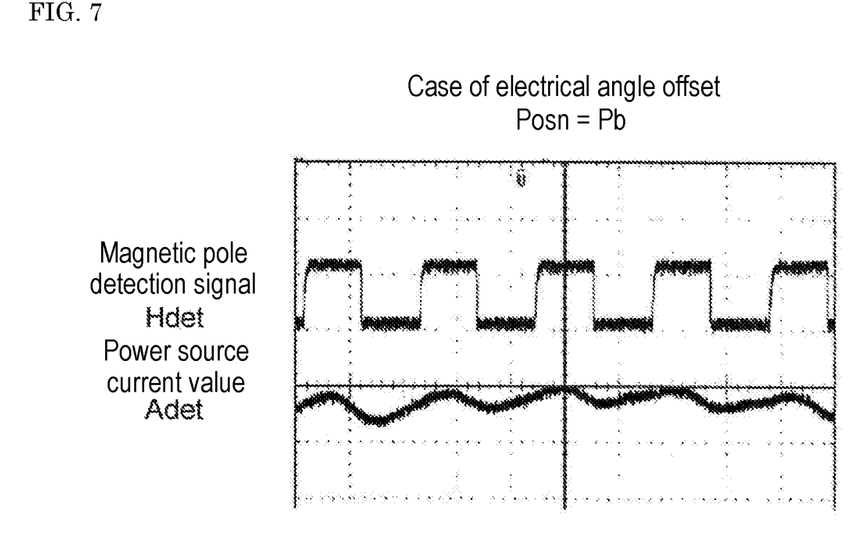
FIG. 7 is a graph illustrating the magnetic pole detection signal and the power source current value when the electrical angle offset is set to be electrical angle offset Pb described in FIG. 5.

FIG. 6 is a graph illustrating magnetic pole detection signal Hdet and power source current value Adet when electrical angle offset Posn is set to be 0. FIG. 7 is a graph illustrating magnetic pole detection signal Hdet and power source current value Adet when electrical angle offset Posn is set to be electrical angle offset Pb illustrated in FIG. 5. It can be understood from FIGS. 6 and 7 that, when electrical angle offset Posn is set to be electrical angle offset Pb when evaluation value Eval is minimized, a vibration width of power source current value Adet in current detector 3 is reduced, in other words, the torque ripple is lowered.

Next, a specific processing example for determining appropriate electrical angle offset Posn will be described.

Figure 8:
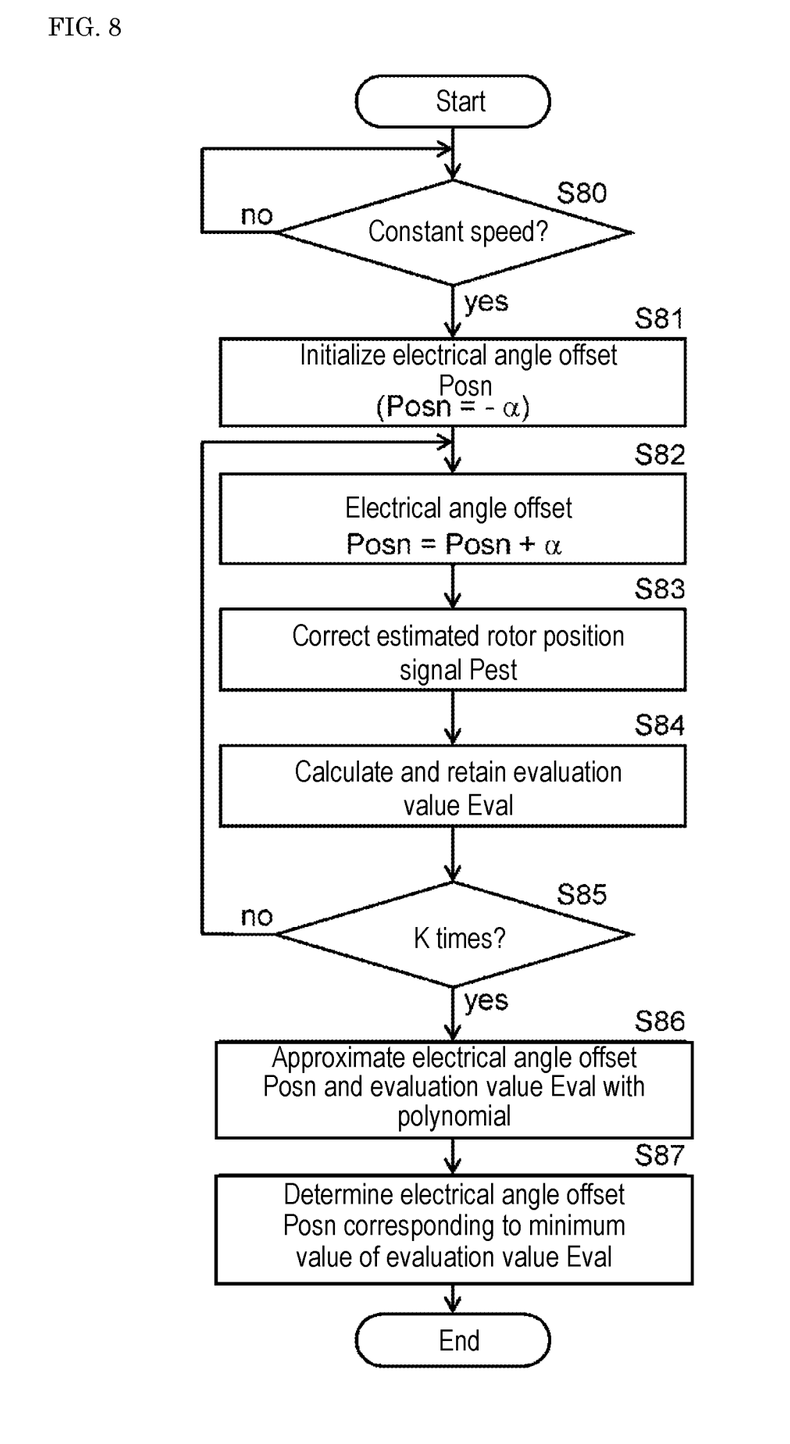
FIG. 8 is a flowchart illustrating a processing example for determining the electrical angle offset in the electrical angle correction unit.

FIG. 8 is a flowchart illustrating the processing example for determining electrical angle offset Posn in electrical angle correction unit 7. The processing in FIG. 8 may be performed any time during rotary operation, may be performed immediately after starting the rotary operation, or may be performed on factory shipment, as an adjustment operation for determining appropriate electrical angle offset Posn. In FIG. 8, electrical angle correction unit 7 first determines whether brushless motor 5 is performing the rotary operation at the constant speed (step S80). When brushless motor 5 is not performing the rotary operation at the constant speed ("no" in step S80), electrical angle correction unit 7 repeats the determination until the rotary operation at the constant speed is achieved. When brushless motor 5 is performing the rotary operation at the constant speed ("yes" in step S80), electrical angle correction unit 7 initializes the value of electrical angle offset Posn to be −a (step S81). For example, a may be 1 degree, 0.5 degrees, or another value. Further, electrical angle correction unit 7 adds a to electrical angle offset Posn to update Posn (step S82). Electrical angle offset Posn for the first time turns to be 0. Electrical angle correction unit 7 adds electrical angle offset Posn to estimated rotor position signal Pest in the period when magnetic pole detection signal Hdet is the low level to correct estimated rotor position signal Pest (step S83). In this state, electrical angle correction unit 7 calculates evaluation value Eval according to (Expression 1), and retains electrical angle offset Posn and evaluation value Eval associating with each other (step S84). Further, electrical angle correction unit 7 determines whether a number of repetition times of steps S82 to S84 reaches K times (step S85). When the number of repetition times of steps S82 to S84 does not reach K times ("no" in step S85), electrical angle correction unit 7 returns to step S82. K is an integer indicating the number of repetition times.

Evaluation values Eval corresponding to K electrical angle offsets Posn are thus retained.

Electrical angle correction unit 7 approximates a relationship between K pairs of electrical angle offsets Posn and evaluation values Eval with the polynomial (step S86). This approximation may be approximation with a quadratic as illustrated in FIG. 5. Electrical angle correction unit 7 determines a value of electrical angle offset Posn corresponding to minimum evaluation value Eval in the polynomial as appropriate electrical angle offset Posn (step S87).

After the above-described operation, electrical angle correction unit 7 outputs appropriate electrical angle offset Posn, thereby suppressing fluctuation in power source current value Adet as illustrated in FIG. 7. This can eventually reduce the torque ripple.

Brushless motor control apparatus 14 of the present exemplary embodiment eliminates necessity of an induced voltage detection circuit and a Hall sensor with high precision and high sensitivity. This can allow brushless motor control apparatus 14 to be a simple circuit configuration. Further, a reduction in circuit area and cost can be achieved. In addition, due to the reduced torque ripple, current vibration during motor rotation is reduced in addition to a decrease in rotation vibration and noise and improved lifetime of a bearing. Therefore, it is possible for an average current value flowing through the motor to be further closer to an allowable maximum value of the circuit. Hence, a circuit that is larger in size for securing those margins does not need to be mounted. For example, when brushless motor 5 is used for a cooling fan, a further reduction in size and weight of the cooling fan can be achieved.

Figure 9:
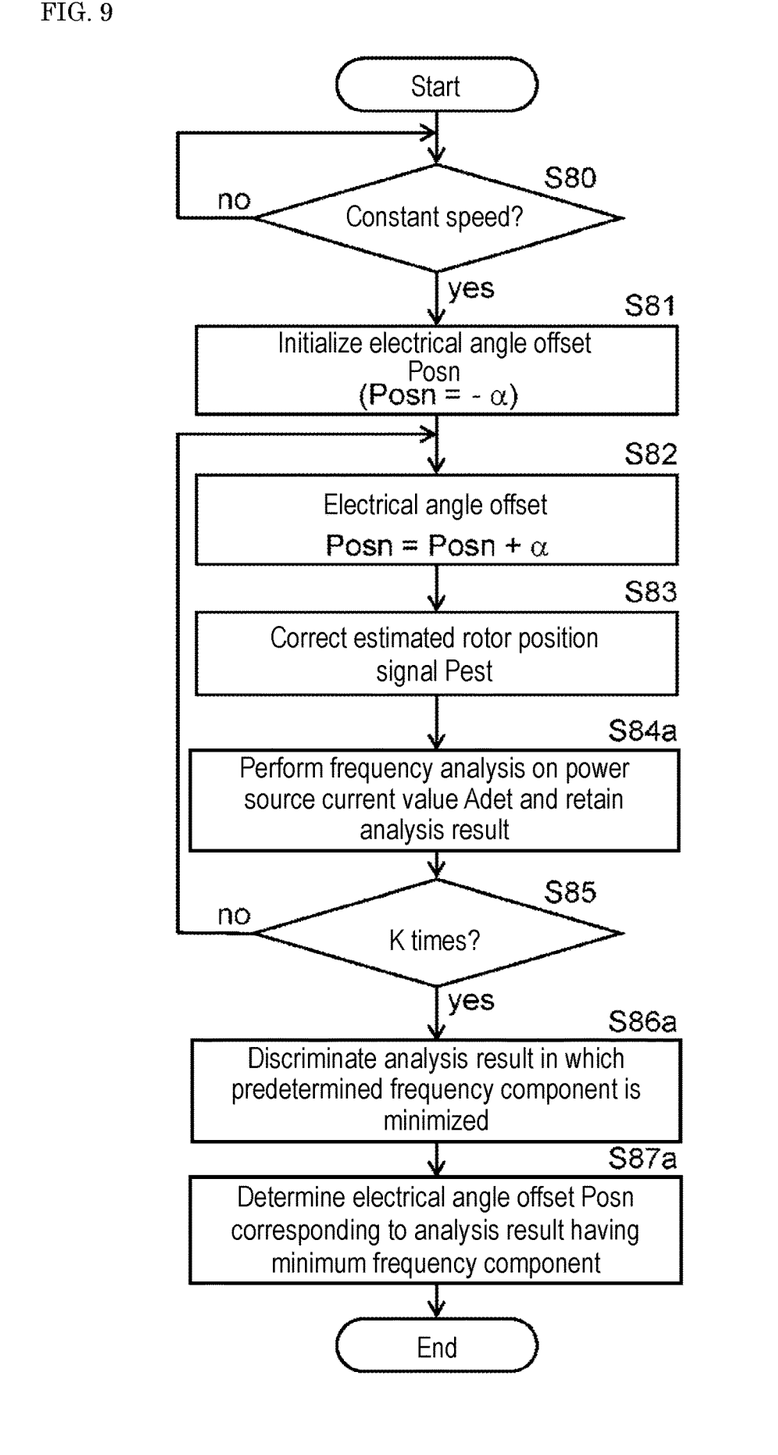
FIG. 9 is a flowchart illustrating another processing example for determining the electrical angle offset in the electrical angle correction unit.

Note that the processing for determining appropriate electrical angle offset Posn is not limited to FIG. 8. For example, appropriate electrical angle offset Posn may be determined with processing illustrated in FIG. 9. FIG. 9 is a flowchart illustrating another processing example for determining electrical angle offset Posn in electrical angle correction unit 7. FIG. 9 is different from FIG. 8 in that steps S84a, S86a, S87a are employed instead of steps S84, S86, S87. Hereinafter, a description will be given focusing on differences.

In step S84a, electrical angle correction unit 7 performs frequency analysis on power source current value Adet, and retains electrical angle offset Posn and an analysis result associating with each other.

In step S86a, electrical angle correction unit 7 discriminates an analysis result in which a predetermined frequency component is minimized among the analysis results. The predetermined frequency component may be calculated from a number of pole pairs of rotor magnets and a rotary speed.

In step S87a, electrical angle correction unit 7 determines electrical angle offset Posn corresponding to the analysis result having the minimum frequency component as appropriate electrical angle offset Posn.

A brushless motor control method in brushless motor control apparatus 14 will be described.

Figure 10:
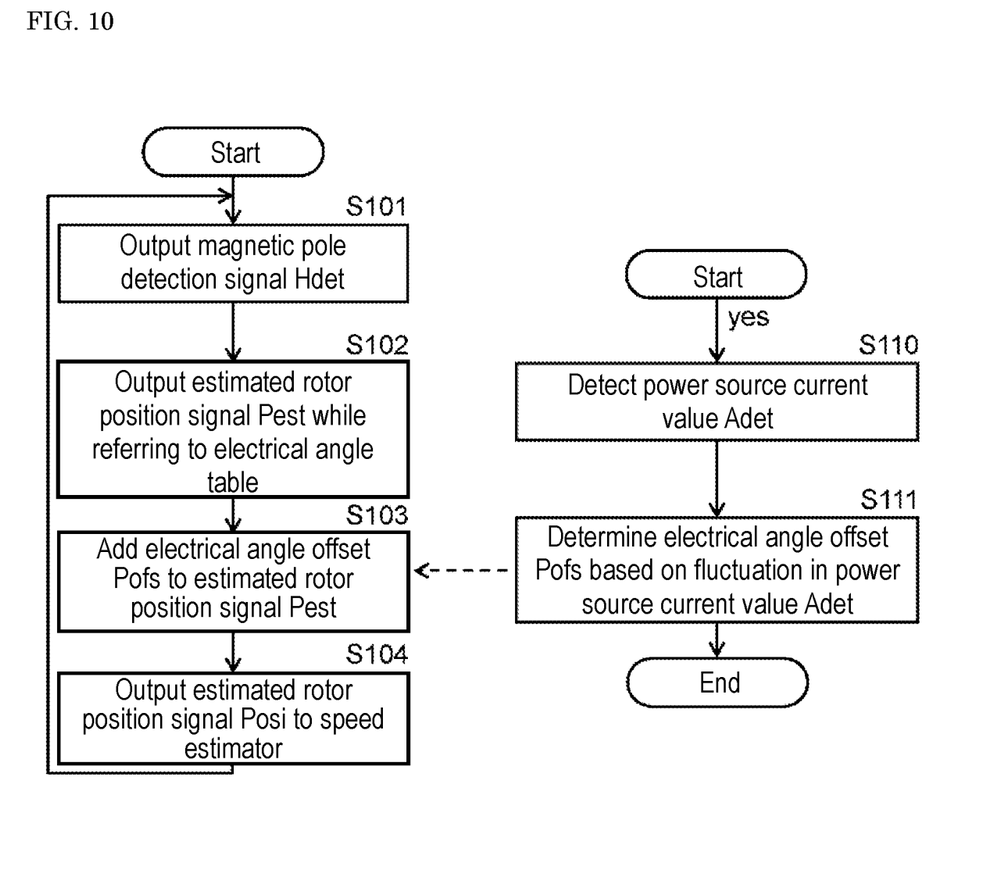
FIG. 10 is a flowchart illustrating a brushless motor control method according to the exemplary embodiment.

FIG. 10 is a flowchart illustrating a brushless motor control method according to the exemplary embodiment. FIG. 10 illustrates a brushless motor control method that uses inverter circuit 4 for applying a drive voltage to the winding of each phase in the brushless motor, in brushless motor control apparatus 14 illustrated in FIG. 1.

As illustrated in FIG. 1, rotor magnetic pole detector 6 outputs digital magnetic pole detection signal Hdet corresponding to the rotor position of brushless motor 5 based on the change of the magnetic pole detected by Hall sensor 6a (step S101). Rotor position estimator 11 outputs, each time a level of magnetic pole detection signal Hdet is switched, estimated rotor position signal Pest that indicates the estimated rotor position with the electrical angle and indicates a predetermined electrical angle corresponding to the level after switching while referring to electrical angle table unit 12 (step S102).

Further, current detector 3 detects a current supplied to inverter circuit 4 as power source current value Adet (step S110), and determines electrical angle offset Pofs based on fluctuation in power source current value Adet (step S111).

Electrical angle correction unit 7 corrects estimated rotor position signal Pest by adding electrical angle offset Pofs to the electrical angle indicated by estimated rotor position signal Pest (step S103). Electrical angle correction unit 7 outputs estimated rotor position signal Posi after the correction to speed estimator 13 (step S104).

Steps S101 to S104 are processes that are temporally continuously performed during the rotary operation of brushless motor 5, and are performed simultaneously. Signals in those steps are time series signals, and are output simultaneously. Processes in steps S110 and S111 may be substantially the same as processes in FIG. 8 or FIG. 9, and are denoted by simplifying the processes in FIG. 8 or FIG. 9. Similar to FIG. 8 and FIG. 9, steps S110 and S111 may be performed any time, may be performed immediately after starting the rotary operation, or may be performed on factory shipment.

As described above, according to brushless motor control apparatus 14 and the brushless motor control method of the present exemplary embodiment, only in the low-level period of digital magnetic pole detection signal Hdet corresponding to the rotor position of brushless motor 5, which is output by rotor magnetic pole detector 6 based on a change of the magnetic pole detected by Hall sensor 6a, the predetermined offset with the predetermined method is added to the estimated position of the electrical angle. With this configuration, in the present exemplary embodiment, even when the high-level period and the low-level period indicated by magnetic pole detection signal Hdet become uneven due to influence of variation in response of Hall sensor 6a (an offset of a Hall element and hysteresis of an internal comparator), estimated rotor position signal Posi that is input into PWM waveform generator 2 and indicates the electrical angle always becomes a value closer to a real rotor position regardless of the rotor position during rotation. Therefore, a phase of the drive voltage applied to brushless motor 5 is continuously changed without being changed (jumped) largely in a discontinuous manner at the rising or falling edge of Hall sensor 6a. Therefore, the current waveform of brushless motor 5 becomes a clean sine waveform, thereby reducing the torque ripple.

When the torque ripple is reduced with the present exemplary embodiment, a decrease in rotation vibration and noise, and improved lifetime of a bearing can be achieved. In addition, current vibration from the power source to inverter circuit 4 is also reduced during rotation of brushless motor 5, and therefore it is possible for an average current value supplied from the power source to be further closer to an allowable value (a threshold for an overcurrent error) of the power source circuit. Hence, a motor core, bearing, and circuit that are larger in size do not need to be mounted to secure those margins. In addition, an induced voltage detection circuit and a high-precision Hall sensor do not need to be provided. High-precision attachment of a sensor position does not need to be performed as well. Accordingly, the brushless motor control apparatus can be achieved with a simple circuit configuration, and parts cost and manufacturing cost can be reduced. For example, for the cooling fan, a decrease in size, weight, and cost can be achieved.

As described above, brushless motor control apparatus 14 according to the present exemplary embodiment includes inverter circuit 4 that applies a drive voltage to a winding of each phase of brushless motor 5, rotor magnetic pole detector 6 that outputs magnetic pole detection signal Hdet corresponding to a rotor position of brushless motor 5 based on a change of a magnetic pole detected by Hall sensor 6a, rotor position estimator 11 that outputs, each time a level of magnetic pole detection signal Hdet is switched, estimated rotor position signal Pdet that indicates an estimated rotor position with an electrical angle and indicates a predetermined electrical angle corresponding to the level after switching, current detector 3 that detects a current supplied to inverter circuit 4 as power source current value Adet, and electrical angle correction unit 7 that corrects estimated rotor position signal Pest by determining electrical angle offset Pofs based on fluctuation in power source current value Adet and adding electrical angle offset Pofs to the electrical angle indicated by estimated rotor position signal Pest.

With this configuration, a shift of a detected position of a rotor due to variation in response or a positional shift of Hall sensor 6a can be corrected to reduce fluctuation in power source current value Adet, without adding parts unnecessary upon a normal rotation. Accordingly, torque ripple can be reduce d.

Herein, electrical angle correction unit 7 may calculate variance of power source current value Adet during a rotary operation of brushless motor 5 at a constant speed as evaluation value Eval, and may determine electrical angle offset Pofs corresponding to a minimum value of evaluation value Eval.

With this configuration, electrical angle offset Pofs that minimizes the variance of power source current value Adet can be determined.

Herein, electrical angle correction unit 7 may add electrical angle offset Pofs to the electrical angle indicated by estimated rotor position signal Pest in a period of any one of a high level and a low level of magnetic pole detection signal Hdet.

With this configuration, current fluctuation is reduced by correcting an electrical angle corresponding to one of a rising edge and a falling edge of magnetic pole detection signal Hdet, thereby reducing torque ripple.

Herein, electrical angle correction unit 7 may correct estimated rotor position signal Pest a plurality of times while gradually increasing or decreasing electrical angle offset Pofs during a rotary operation of brushless motor 5 at a constant speed, may retain variance of a plurality of the power source current values detected by current detector 3 for each electrical angle offset Pofs as evaluation value Eval, may approximate a relationship between electrical angle offset Pofs and evaluation value Eval with a polynomial, and may determine electrical angle offset Pofs corresponding to minimum evaluation value Eval in the polynomial.

With this configuration, electrical angle offset Posn can appropriately be determined using the polynomial.

Herein, electrical angle correction unit 7 may gradually increase or decrease electrical angle offset Pofs during a rotary operation of brushless motor 5 at a constant speed, may perform frequency analysis on power source current value Adet detected by current detector 3 at each electrical angle offset Pofs, and may determine electrical angle offset Pofs corresponding to a minimum value of a predetermined frequency component.

With this configuration, electrical angle offset Posn can appropriately be determined with the frequency analysis.

A brushless motor control method according to the present exemplary embodiment is a brushless motor control method that uses inverter circuit 4 that applies a drive voltage to a winding of each phase of brushless motor 5. The brushless motor control method includes outputting magnetic pole detection signal Hdet corresponding to a rotor position of brushless motor 5 based on a change of a magnetic pole detected by Hall sensor 6a, outputting, each time a level of magnetic pole detection signal Hdet is switched, estimated rotor position signal Pest that indicates an estimated rotor position with an electrical angle and indicates a predetermined electrical angle corresponding to the level after switching, detecting a current supplied to inverter circuit 4 as power source current value Adet, determining electrical angle offset Pofs based on fluctuation in power source current value Adet, and correcting estimated rotor position signal Pest by adding electrical angle offset Pofs to the electrical angle indicated by estimated rotor position signal Pest.

With this configuration, a shift of a detected position of a rotor due to variation in response or a positional shift of Hall sensor 6a can be corrected to reduce fluctuation in power source current value Adet, without adding parts unnecessary upon a normal rotation. Accordingly, torque ripple can be reduced.

INDUSTRIAL APPLICABILITY

In a motor control apparatus and a motor control method according to the present disclosure, torque ripple can be reduced with a simple configuration, and therefore vibration can be minimized. Accordingly the motor control apparatus and the motor control method can be applied not only to a battery cooling blower of a hybrid vehicle but also a household or industrial brushless motor, and particularly are suitable for control of a cooling fan and a blower motor in which high efficiency and low noise are demanded.

REFERENCE MARKS IN THE DRAWINGS

1: speed controller
2: PWM waveform generator
3: current detector
4: inverter circuit
5: brushless motor
6: rotor magnetic pole detector
6a: Hall sensor
7: electrical angle correction unit
7a: adder
8: evaluation value calculator
9: electrical angle offset generator
10: electrical angle offset switcher
10a: zero generator
10b: selector
11: rotor position estimator
12: electrical angle table unit
13: speed estimator
14: brushless motor control apparatus
SPreq: speed instruction
+B: power source terminal
Adet: power source current value
Dut: PWM duty value
Wpwm: PWM signal
Hdet: magnetic pole detection signal
Pest: estimated rotor position signal
Eval: evaluation value
Posn: electrical angle offset Pofs: electrical angle offset
Posi: estimated rotor position signal
SPest: estimated speed

The invention claimed is:

1. A brushless motor control apparatus comprising:
an inverter circuit that applies a drive voltage to a winding of each phase of a brushless motor;
a rotor magnetic pole detector that outputs a magnetic pole detection signal corresponding to a rotor position of the brushless motor based on a change of a magnetic pole detected by a Hall sensor;
a rotor position estimator that outputs, each time a level of the magnetic pole detection signal is switched, an estimated rotor position signal that indicates an estimated rotor position with an electrical angle and indicates a predetermined electrical angle corresponding to the level after switching;
a current detector that detects a current supplied to the inverter circuit as a power source current value; and
an electrical angle correction unit that corrects the estimated rotor position signal by determining an electrical angle offset based on fluctuation in the power source current value and adding the electrical angle offset to the electrical angle indicated by the estimated rotor position signal.

2. The brushless motor control apparatus according to claim 1, wherein the electrical angle correction unit calculates variance of the power source current value during a rotary operation of the brushless motor at a constant speed as an evaluation value, and determines the electrical angle offset corresponding to a minimum value of the evaluation value.

3. The brushless motor control apparatus according to claim 1, wherein the electrical angle correction unit adds the electrical angle offset to the electrical angle indicated by the estimated rotor position signal, in a period of any one level of a high level and a low level of the magnetic pole detection signal.

4. The brushless motor control apparatus according to claim 1, wherein the electrical angle correction unit corrects the estimated rotor position signal a plurality of times while gradually increasing or decreasing the electrical angle offset during a rotary operation of the brushless motor at a constant speed, retains variance of a plurality of the power source current values detected by the current detector for each electrical angle offset as an evaluation value, approximates a relationship between the electrical angle offset and the evaluation value with a polynomial, and determines the electrical angle offset corresponding to a minimum value of the evaluation value in the polynomial.

5. The brushless motor control apparatus according to claim 1, wherein the electrical angle correction unit gradually increases or decreases the electrical angle offset during a rotary operation of the brushless motor at a constant speed, performs frequency analysis on the power source current value detected by the current detector at each electrical angle offset, and determines the electrical angle offset corresponding to a minimum value of a predetermined frequency component.

6. A brushless motor control method that uses an inverter circuit that applies a drive voltage to a winding of each phase of a brushless motor, the brushless motor control method comprising:
outputting a magnetic pole detection signal corresponding to a rotor position of the brushless motor based on a change of a magnetic pole detected by a Hall sensor;
outputting, each time a level of the magnetic pole detection signal is switched, an estimated rotor position signal that indicates an estimated rotor position with an electrical angle and indicates a predetermined electrical angle corresponding to the level after switching;
detecting a current supplied to the inverter circuit as a power source current value;
determining an electrical angle offset based on fluctuation in the power source current value; and
correcting the estimated rotor position signal by adding the electrical angle offset to the electrical angle indicated by the estimated rotor position signal.

* * * * *